May 27, 1924.  1,495,677
C. DESOUTTER
JOINT FOR ARTIFICIAL LIMBS
Filed Sept. 21, 1922
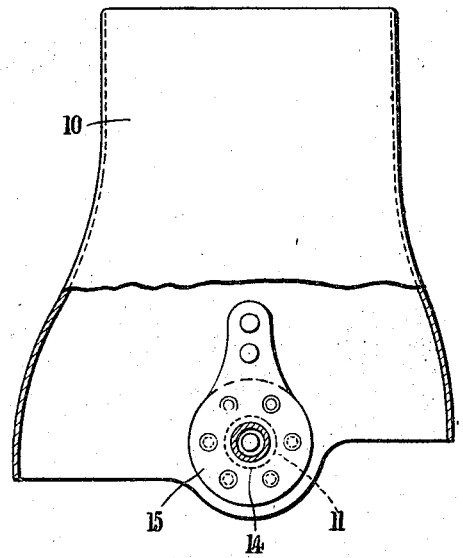
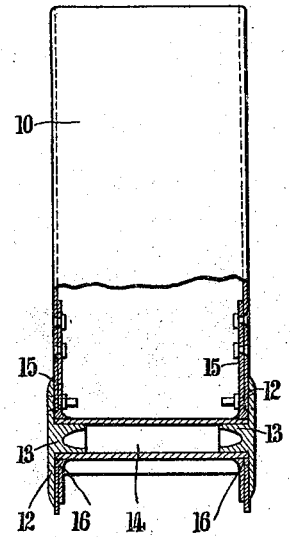
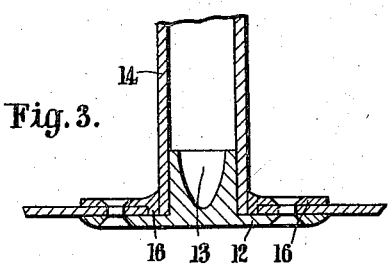
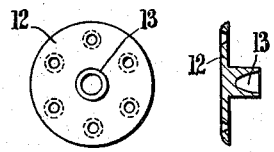
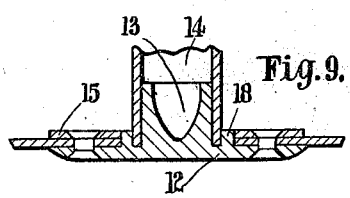
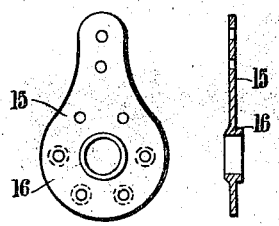
Inventor
Charles Desoutter
By Percy H. Moore
atty Patented May 27, 1924.

1,495,677

UNITED STATES PATENT OFFICE.

CHARLES DESOUTTER, OF LONDON, ENGLAND, ASSIGNOR TO DESOUTTER BROTHERS LIMITED, OF LONDON, ENGLAND.

JOINT FOR ARTIFICIAL LIMBS.

Application filed September 21, 1922. Serial No. 589,512.

*To all whom it may concern:*

Be it known that I, CHARLES DESOUTTER, a subject of the King of Great Britain and Ireland, residing at London, in the county of London, England, have invented certain new and useful Improvements in Joints for Artificial Limbs, of which the following is a specification.

This invention relates to artificial limbs and has for its object to provide an improved joint for such limbs.

With artificial limbs especially those made chiefly from sheet metal, the method of supporting the pin portion of joints such as an ankle, knee or elbow joints presents great difficulties. In the first place weight must be kept to a minimum, whilst the pin must be of a material able to withstand wear and the strain of the other part of the joint. Also, on the one hand the portion of the pin coming on the inside of the limb, i. e., between the supporting "walls" of the metal, should be left quite free, to give a maximum support to and facilitate the working of the other part of the joint, which on the other hand necessitates either that the pin should be fixed in position outside the walls, by adequate means, giving objectional projections, etc., or that only a flimsy and unsubstantial support should be given to the pin by the thin side walls, resulting in many cases, after slight wear in the pin tearing out.

According to this invention the above difficulties are overcome and yet the pin is firmly and substantially held in position.

In the general method of carrying the invention into effect, the pin is formed tubular and of such length that it extends across the limb from "wall" to "wall" in the desired position. Coming on the outside of each wall and suitably attached thereto is a thin flat plate formed or provided with an inwardly projecting and preferably hollow plug adapted to fit within the end of the tubular pin, means being preferably provided to prevent the pin turning on the plugs. In addition coming on the inside of the walls and suitably attached thereto other thin washer plates may be provided formed preferably with a slight boss engaging with apertures in the walls and around the pin.

In this manner, practically the whole length of the pin between the walls is left free for co-operation with the other portion of the joint and the exterior projections are a minimum. At the same time the weight is but trifling and the pin is fixed in a firm and substantial manner, ensuring a satisfactory joint.

One method of carrying the invention into effect is illustrated on the accompanying drawing, in which:—

Fig. 1 is a side elevation partly in section of the casing forming the upper portion of an artificial ankle to which the invention has been fitted.

Fig. 2 is an end elevation of same, partly in section.

Fig. 3 is an enlarged sectional plan showing the method of attaching the ends of the pin.

Fig. 4 is a front elevation and Fig. 5, a sectional side view of the plate and plug portion of the device.

Fig. 6 and Fig. 7 are similar views to Figs. 4 and 5, but of the inner washer portion of the device.

Fig. 8 is a longitudinal section of the tubular pin.

Fig. 9 is a similar view to Fig. 3, but of a modification.

The same numerals of reference are employed to denote the same parts in all the views.

10 is the casing forming the upper part of the artificial ankle this is shaped as shown and provided with two circular apertures 11, coming opposite to each other. 12 are thin circular plates formed with hollowed circular plugs 13; 14 is the tubular pin with an internal diameter of such size as to fit tightly on to the plugs 13. 15 are thin inner washer plates shaped as shown and formed with circular bosses 16, of such size and height as to fit snugly without projecting in the apertures 11 and at the same time fitting tightly around the pin 14. When the parts are assembled as shown in Fig. 2, the outer plates 12 and inner washer plates 15 are riveted in position to the casing 10 as shown, suitable holes, some countersunk being provided for the purpose.

All the parts, excepting the pin 14 are preferably made of light material such as aluminium or an aluminium alloy, whilst the pin 14, which takes the strain and wear of the other portion of the joint is preferably made of steel.

The inner surface of the tubular pin 14, which engages the plugs 13 is preferably serrated to prevent the pin 14 turning on the plugs. According to one method as shown at 17, Fig. 8, these serrations are longitudinal, and slightly burr up and engage the softer material of the plugs 13, which are a force fit therein. In addition if desired the outer surface of the pin 14, towards the ends may be serrated to engage with the plate 15.

Other means may be employed for preventing the pin 14, turning, such as a key and keyways, a projection on the inside of one or both of the plates 12 engaging a notch or notches in the ends of the pin, or vice versa.

In Fig. 9, a construction is shown in which the boss 16 is dispensed with and is replaced by an annular ridge 18, formed on or attached to the inner face of the plate 12. This ridge is concentric with the plug 13, and as will be seen an annular groove is left for the reception of the end of the pin 14. The ridge 18 is preferably a tight fit in the aperture 11 and in the hole in the plate 15.

It will be seen that the pin 14 is both strong and able to withstand wear and at the same time light. Further practically the whole of the length of the pin between the walls of the casing 10 is free for co-operation with the other part of the joint. In addition it is firmly held at its ends and for some distance therefrom inside and also outside, and the means for holding it are firmly attached to the casing, in such a way as to distribute the stresses in an efficient manner.

It is obvious that the invention may be modified in many ways, still keeping to the general principle of the invention within the scope of the claims, for instance in some cases only the ends of the pin 14 could be formed tubular and the remaining inner portion solid.

What I claim as my invention and desire to secure by Letters Patent of the United States of America is:—

1. In a joint for an artificial limb, a pin connecting two parts of the limb together, said pin having tubular ends, members secured to one of the said limb parts at opposite sides thereof, and said members having plugs adapted to engage in the ends of the pin.

2. In a joint for an artificial limb, a pin connecting two parts of the limb together, said pin having tubular ends, thin plates connected to the outside of one of the said limb parts at opposite sides thereof, and said plate having inwardly projecting plugs adapted to engage in the ends of the pin.

3. In a joint for an artificial limb, a pin connecting two parts of the limb together, said pin having tubular ends, thin plates connected to the outside of one of the said limb parts at opposite sides thereof, and said plate having inwardly projecting plugs adapted to engage in the ends of the pin, and thin plates connected to the inside of one of said limb parts, said last mentioned plates formed with a part to engage the outer surface of said pin.

4. In a joint for an artificial limb, a pin connecting two parts of the limb together, one of said limb parts provided with apertures, said pin having tubular ends, thin plates connected to the outside of one of the said limb parts at opposite sides thereof, said plate having inwardly projecting plugs adapted to engage in the ends of the pin, thin plates connected to the inside of one of said limb parts, said last mentioned plates having bosses engaging in said apertures and also engaging the outer surface of the pin.

5. In a joint for an artificial limb, a pin connecting two parts of the limb together, said pin having tubular ends, members secured to one of the said limb parts at opposite sides thereof, and said members having plugs adapted to engage in the ends of the pin and means for preventing the pin rotating with respect to the plugs.

6. In a joint for an artificial limb, a pin connecting two parts of the limb together, said pin having tubular ends, members secured to one of the said limb parts at opposite sides thereof, and said members having plugs adapted to engage in the ends of the pin, the inner ends of the pin in which the plugs engage being serrated to prevent relative rotation of the pin and plugs.

7. In a joint of an artificial limb, a pin of hard metal connecting two parts of the limb together, said pin having tubular serrated ends, members secured to one of the said limb parts at opposite sides thereof, said members having plugs of relatively soft metal adapted to engage the serrations in the ends of the pin to prevent relative rotation of the pin and plugs.

In witness whereof I have affixed my signature this 8th day of September, 1922, at London, England.

CHARLES DESOUTTER.